UNITED STATES PATENT OFFICE.

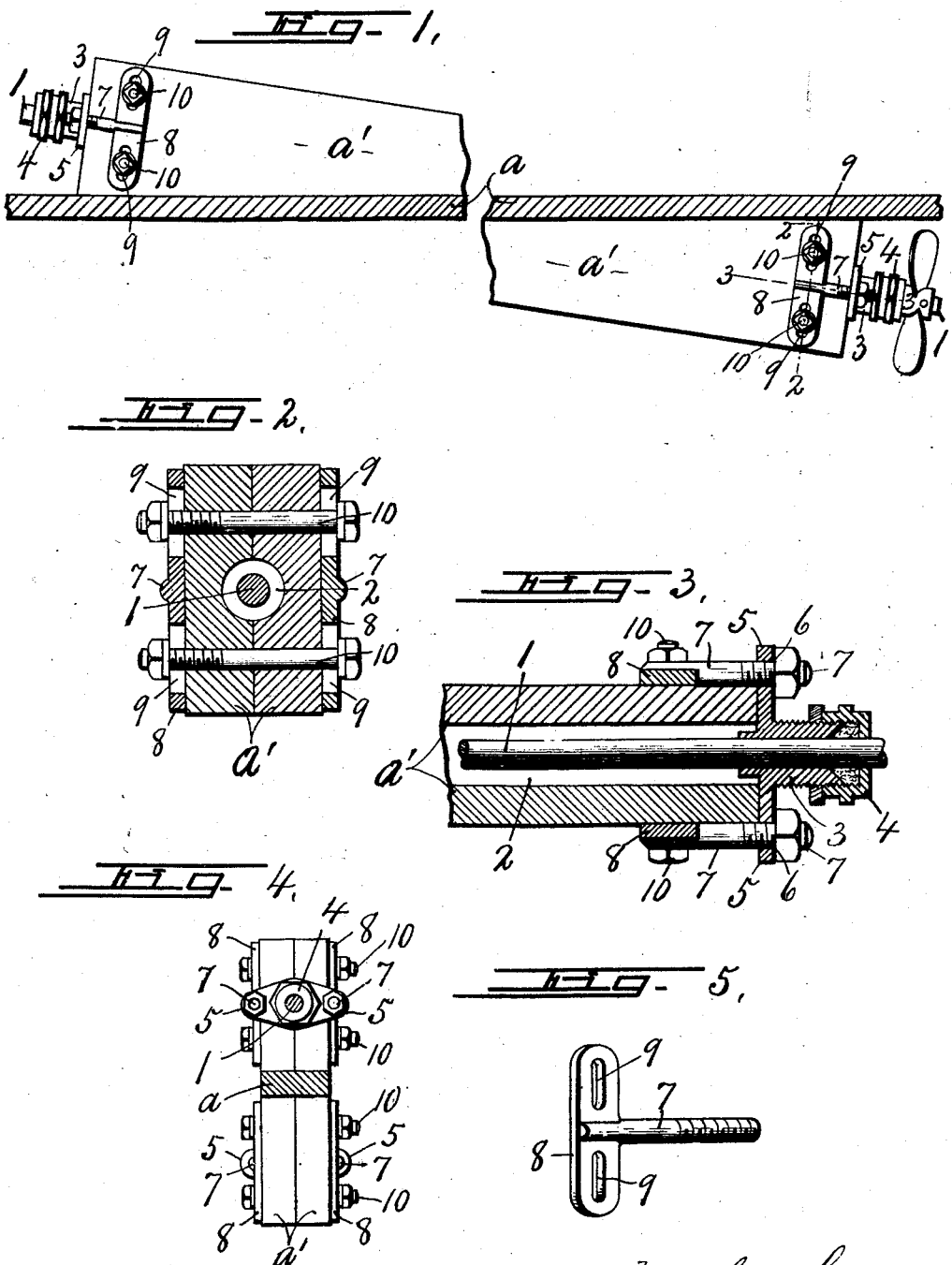

MATHEW HEMMER, OF SYRACUSE, NEW YORK.

ADJUSTABLE BEARING FOR BOAT-SHAFTS.

1,037,621.   Specification of Letters Patent.   Patented Sept. 3, 1912.

Application filed June 14, 1912. Serial No. 703,729.

*To all whom it may concern:*

Be it known that I, MATHEW HEMMER, of Syracuse, in the county of Onondaga, in the State of New York, have invented new and useful Improvements in Adjustable Bearings for Boat-Shafts, of which the following, taken in connection with the accompanying drawings, is a full, clear, and exact description.

This invention relates to certain improvements in supports for propeller shafts for motor boats and similar craft, the object being to provide simple means for permitting the shaft to adjust itself and its bearings to proper alinement in case the shaft should become sprung by the warping or buckling of the parts of the boat in which it is mounted.

It is well known that when a boat is drydocked for a greater or less period of time after being in the water and afterward replaced in the water, there is always more or less warping, shrinkage or buckling of the frame, thereby causing the shaft to spring or bind in its bearings to such an extent as to prevent its free rotation, making it necessary to entirely remove the bearings and refit the shaft to the log through which it is passed.

The primary object of my invention is to provide simple means whereby the shaft bearings may be properly adjusted to relieve the shaft from binding therein without removing any of the bearings or necessitating the formation of new or additional boatholes in which the bearings are secured to the log by bolts.

Another object is to provide for a limited endwise adjustment of the bearings relatively to the log without shifting the vertically adjustable clamping plates.

A still further object is to make the opening in the log through which the shaft passes sufficiently large to allow a limited radial adjustment of any portion of the shaft in any direction.

Other objects and uses will be brought out in the following description:

In the drawings:—Figure 1 is a sectional view partly broken away of a portion of the bottom of a boat showing my improved shaft-supporting means in elevation. Figs. 2 and 3 are respectively an enlarged transverse vertical sectional view and an enlarged horizontal sectional view of portions of the bearings and clamping means therefor at the rear end of the shaft taken on lines 2—2 and 3—3, Fig. 1. Fig. 4 is a front end view of the shaft and adjacent bearing together with the log in which the shaft is mounted, a portion of the keel being shown in section. Fig. 5 is a perspective view of one of the detached clamping members for one of the bearings.

In order that my invention may be clearly understood, I have shown a portion of the keel —a— of a boat together with the usual log —a'— in which the propeller shaft as —1— is mounted, said log being usually made up of sections as shown in Fig. 2 and provided with a central bore —2— of considerably greater diameter than the shaft —1— so as to allow radial adjustment of all portions of said shaft in any direction. The opposite ends of the propeller shaft —1— are journaled in suitable bearings —3— which are secured to corresponding ends of the log —a'— in a manner presently described and are provided with stuffing boxes or glands —4— to prevent leakage of water along the shaft into the boat.

Each bearing is alined centrally with the opening —2— in the log and is provided with diametrically opposite lugs or flanges —5— extending some distance beyond the sides of said log and formed with apertures or bolt openings —6— for the reception of clamping bolts —7—. The inner ends of the clamping bolts —7— are provided with laterally elongated flat clamping plates or heads —8— having radially elongated slots —9— for receiving clamping bolts —10— which are passed transversely through the log to firmly hold the clamping members —8— in operative position, the elongated slots —9— serving to permit vertical adjustment of the clamping bolts —7— and bearings —3— mounted thereon, thereby allowing the shaft and bearings to adjust themselves to perfect alinement by simply loosening the bolts —10—. The width of the slots —9— is slightly greater than the diameters of the bolts —10— which they receive to permit a slight tilting movement of the bolts —7— in case the end face of the log should not be exactly parallel with the clamping plates or heads —8—. The bolts —7— are also of sufficient length to permit axial adjustment of the bearings —3— and compensate for any slight variations in the distances between the centers of the clamping plates —8— and adjacent ends of the log after the plates have been secured in place.

The flanges —5— of the bearings —3— are drawn firmly against the adjacent ends of the log by means of the nuts of the bolts —7—, thereby making a water tight joint and permitting the use of packing in such joint if necessary.

In case the frame of the boat and particularly the log or keel should warp or shrink to such an extent as to buckle or spring the shaft and cause it to bind in its bearings, the clamping bolts —10— on one or both ends of the lug may be loosened, thus freeing the corresponding bearing or bearings —3— and permitting the shaft to restore itself to proper alinement or to be restored to such alinement by springing, in which case the bearing or bearings —3— will simply move across the adjacent face of the log until the shaft moves freely, whereupon the bolts —10— may be retightened to draw the flanges —5— of the bearings —3— firmly against the ends of the log for holding the shaft in proper alinement.

What I claim is:

1. In combination with a shaft receiving log and propeller shaft of a boat, said log having a shaft opening of greater diameter than that of the shaft, shaft bearings adjustable across the ends of the log, and clamping members having bearings adjustably secured to the sides of the log.

2. In combination with the log and propeller shaft of a boat, the log having a shaft opening therethrough of greater width than the diameter of the shaft, a shaft bearing having laterally projecting ears bearing against the end of the log and adjustable transversely thereof, said ears being provided with bolt openings, clamping bolts passing through said openings and provided with clamping plates having radially elongated bolt openings, and bolts passed through said openings and through the log for adjustably securing said plates to said log.

In witness whereof I have hereunto set my hand on this 4th day of June 1912.

MATHEW HEMMER.

Witnesses:
H. E. CHASE,
E. S. TUCKER.

---

Copies of this patent may be obtained for five cents each, by addressing the "Commissioner of Patents, Washington, D. C."